(12) United States Patent
Dorner et al.

(10) Patent No.: US 7,309,204 B2
(45) Date of Patent: Dec. 18, 2007

(54) ARTICULATED ARM ROBOT

(75) Inventors: Reiner Dorner, Eppingen (DE); Joachim Pottiez, Sulzfeld (DE)

(73) Assignee: Schuler Automation GmbH & Co. KG, Louis-Schuler-Strasse (DE)

( * ) Notice: Subject to any disclaimer, the term of this patent is extended or adjusted under 35 U.S.C. 154(b) by 76 days.

(21) Appl. No.: 11/311,123

(22) Filed: Dec. 20, 2005

(65) Prior Publication Data

US 2007/0140823 A1 Jun. 21, 2007

(51) Int. Cl.
*B25J 17/02* (2006.01)
(52) U.S. Cl. .................... 414/737; 74/490.06; 294/65; 901/29; 901/40
(58) Field of Classification Search .............. 414/736, 414/737, 680, 685; 901/15, 28, 29, 40; 74/490.01, 74/490.05, 490.06; 294/65
See application file for complete search history.

(56) References Cited

U.S. PATENT DOCUMENTS

| | | | | | |
|---|---|---|---|---|---|
| 3,630,389 | A | * | 12/1971 | Schmidt et al. ............... | 414/4 |
| 4,661,040 | A | | 4/1987 | Cigna | |
| 4,794,513 | A | * | 12/1988 | Muller ....................... | 700/63 |
| 5,222,854 | A | * | 6/1993 | Blatt et al. ............... | 198/463.3 |

FOREIGN PATENT DOCUMENTS

| DE | 196125251 A1 | 10/1997 |
|---|---|---|
| EP | 0636435 A1 | 2/1995 |
| EP | 0658403 A1 | 6/1995 |
| EP | 0771621 A2 | 5/1997 |
| GB | 2312414 A1 | 10/1997 |
| JP | 63-194832 | 8/1988 |
| JP | 06328140 A | 11/1994 |

\* cited by examiner

*Primary Examiner*—Donald Underwood
(74) *Attorney, Agent, or Firm*—Browdy and Neimark, PLLC

(57) ABSTRACT

In a multi-axis articulated arm robot for transferring workpieces, there is a robot base, on which a movement unit is able to be pivoted about a first axis, which is vertical in an operational state. The movement unit has a pivoting part adjacent to the base, an articulated arm constituted by a top arm and a bottom arm, such top arm being connected for pivoting at one end about a horizontal second axis with the pivoting part at the other end is connected with the adjacent end of the bottom arm for pivoting about a horizontal third axis, a rotary member arranged at the bottom arm's end opposite to the top arm, such rotary member being able to be rotated about a fourth axis extending in the longitudinal direction of the bottom arm, a pivoting member connected with the rotary member for pivoting about a fifth axis extending athwart the fourth axis, and a supporting part rotatingly connected with the pivoting member, such supporting part extending athwart the fifth axis. On the supporting part a holding means of a lifting means, associated with the workpieces to be transferred, and more particularly a vacuum suction means, is arranged for rotation about a seventh axis. The supporting part is directed in the direction of the sixth axis away from the pivoting member. The seventh axis is directed athwart the sixth axis.

4 Claims, 5 Drawing Sheets

ARTICULATED ARM ROBOT

BACKGROUND OF THE INVENTION

Figure 1:
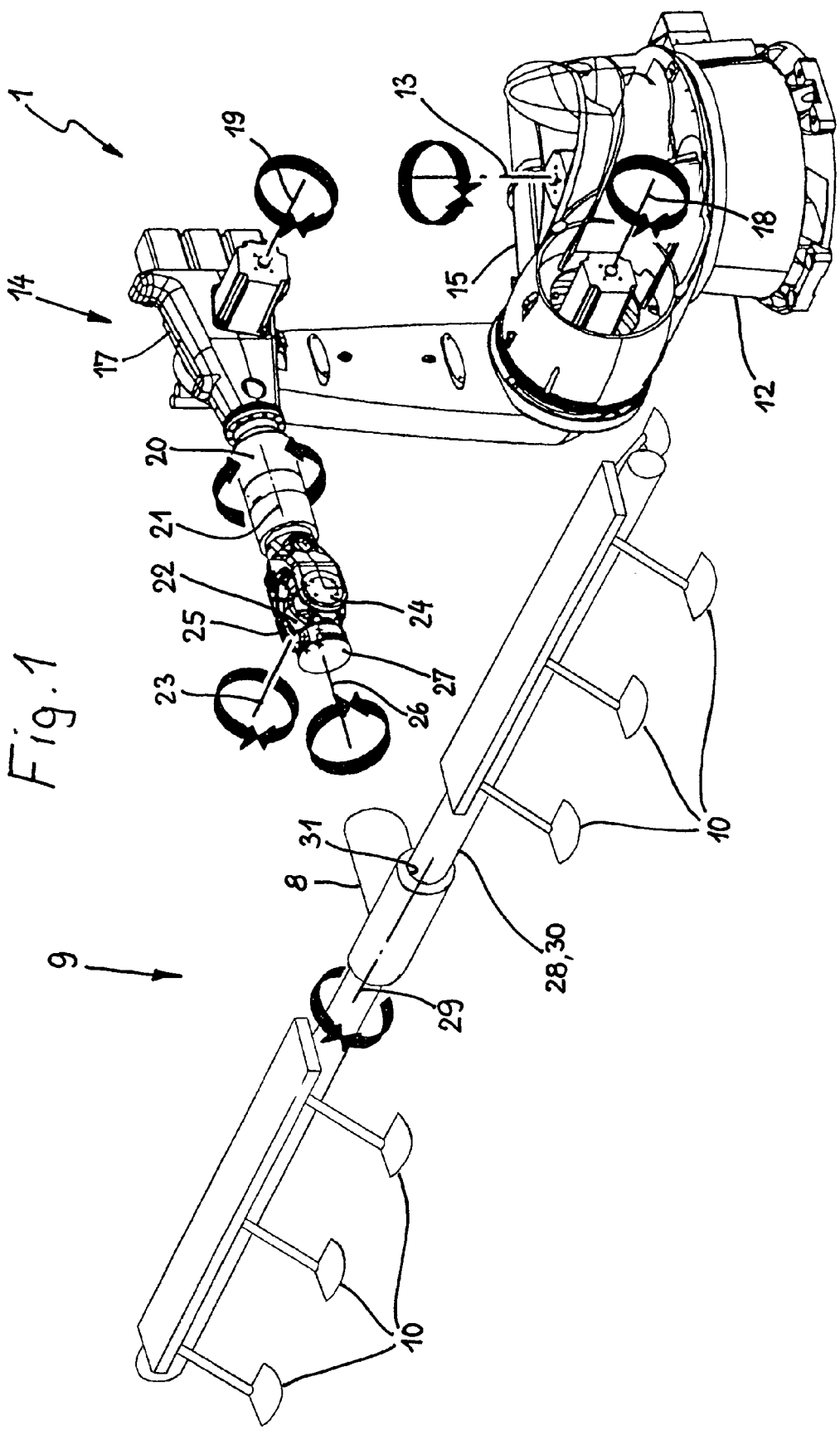

The invention relates to a multiple axis articulated arm robot for transferring workpieces, and more particularly for transferring sheet metal parts into or from a press or from one press to another adjacently placed press, comprising a robot base, on which a movement unit is able to be pivoted about a first axis, which is vertical in an operational state, such movement unit having a pivoting part adjacent to the base, an articulated arm constituted by a top arm and a bottom arm, such top arm being connected for pivoting at one end about a horizontal second axis with the pivoting part and at the other end is connected with the adjacent end of the bottom arm for pivoting about a horizontal third axis, a rotary member arranged at the bottom arm's end opposite to the top arm, such rotary member being able to be rotated about a fourth axis extending in the longitudinal direction of the bottom arm, a pivoting member connected with the rotary member for pivoting about a fifth axis extending athwart the fourth axis, and a supporting part rotatingly connected with the pivoting member, such supporting part extending athwart the fifth axis, on which supporting part a holding means of a lifting means, associated with the workpieces to be transferred, and more particularly a vacuum suction means, is arranged for rotation about a seventh axis.

THE PRIOR ART

Robots of this type may be employed for transferring sheet metal components which are processed in presses. Here it may for example be a question of bodywork parts of motor vehicles.

In the case of one known robot of the type initially mentioned the supporting part is constituted by a support arm extending athwart the sixth axis away from the pivoting member, the holding means of the vacuum suction means being arranged on the opposite end of the support arm. In this case the seventh axis, about which the holding means is able to be turned, runs in parallelism to the sixth axis.

During operation of the robot the sixth and seventh axes are directed at a right angle to the respective sheet metal component and the support arm constituting the supporting part extends parallel to the sheet metal component over it so that the vacuum suction means acts in the middle part of the sheet metal component.

This robot is arranged in front of one of the lateral columns of the frame of the respective press or, respectively, between two columns belonging to two adjacent presses. The shafts defining the different axes are so controlled and driven that the vacuum suction means and with it the respective sheet metal component, is transferred without pivoting and in parallelism to itself.

The support arm is placed comparatively far from the pivoting member so that it extends from a point outside the edge of the sheet metal component as far as the middle part of the component. Therefore owing to the sheet metal component hanging from the vacuum suction means there is a tilting moment proportional to the length of the support arm which is accordingly comparatively large and must be resisted at the sixth axis.

SHORT SUMMARY OF THE INVENTION

One object of the invention, on the basis of these circumstances, is to provide a robot of the type initially mentioned which as regards forces is appropriately designed and may be employed with an economy in space.

In order to achieve these and/or other objects appearing from the present specification, claims and drawings, in the present invention the supporting part extends away from the pivoting member in the direction of the sixth axis and the seventh axis is directed athwart the sixth axis.

When a sheet metal component is held by the vacuum suction means then the center of gravity in an extension of the sixth axis of rotation below the pivoting member so that the said tilting moment is substantially reduced.

The robot does furthermore not need to be arranged between the columns of two press frames. It may also be suspended in its arrangement. It is in this manner that there is free access between the presses. Moreover a very small clearance between presses is possible.

The set of movements necessary for parallel shifting of the sheet metal components is relatively simple. This favors the speed of working. Furthermore as regards the seventh axis arranged in accordance with the invention, it is possible for the sheet metal components to be transferred without having to be turned. Finally satisfactory handling is made possible, more particularly in the case of large sheet metal components.

Preferably a rotary member is mounted on the pivoting member and is able to be turned about the sixth axis, the supporting part being detachably secured to the rotary member. In the case of such a robot the supporting part together with the vacuum suction means may be readily exchanged or removed, if the robot is to be employed for other purposes.

Further features of the invention are disclosed in the claims.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 1 shows a robot in accordance with the invention in an oblique view, the supporting part with the vacuum suction means being represented in the removed state diagrammatically.

Figure 2:
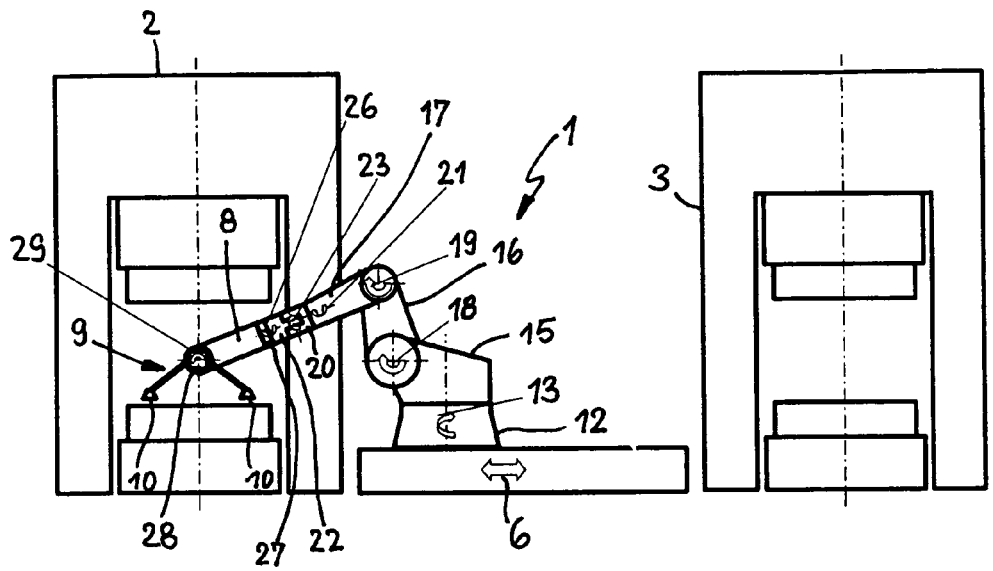
Figure 3:
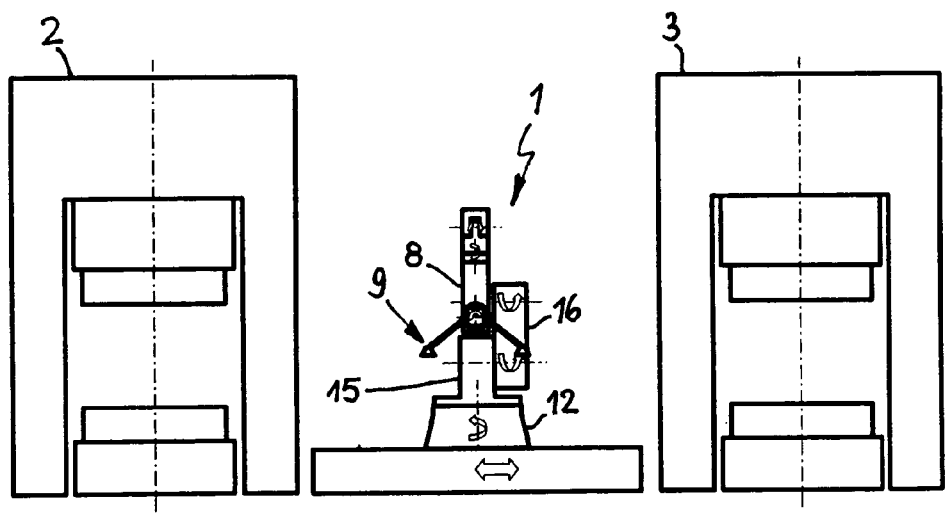
Figure 4:
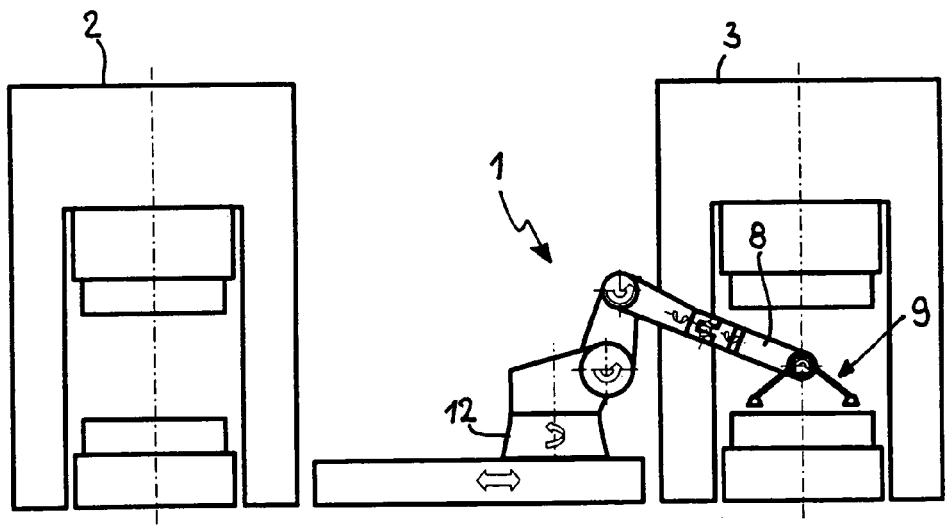

FIGS. 2, 3 and 4 diagrammatically show the articulated arm robot, in a travelling condition, in accordance with FIG. 1 in an upright position between two presses, said robot reaching into one press to receive the respective sheet metal component in FIG. 2, whereas in FIG. 3 it assumes an intermediate position and in FIG. 4 it reaches into the other press to put the component down.

Figure 5:
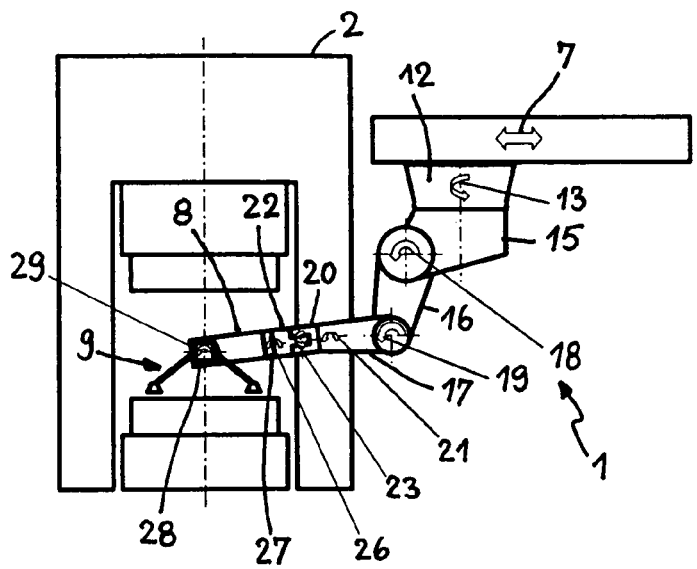
Figure 5:
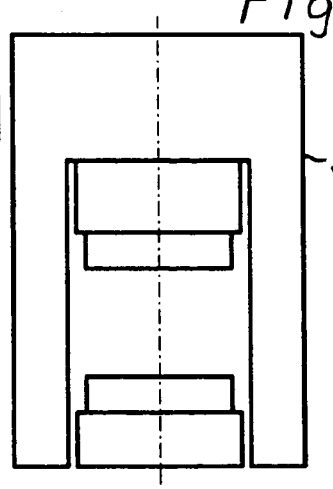
Figure 6:
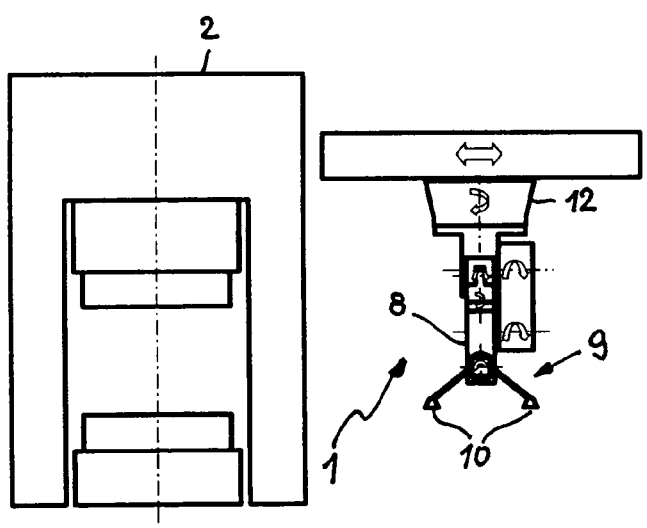
Figure 6:
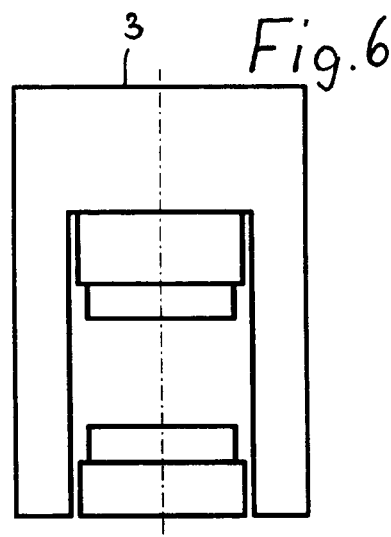
Figure 7:
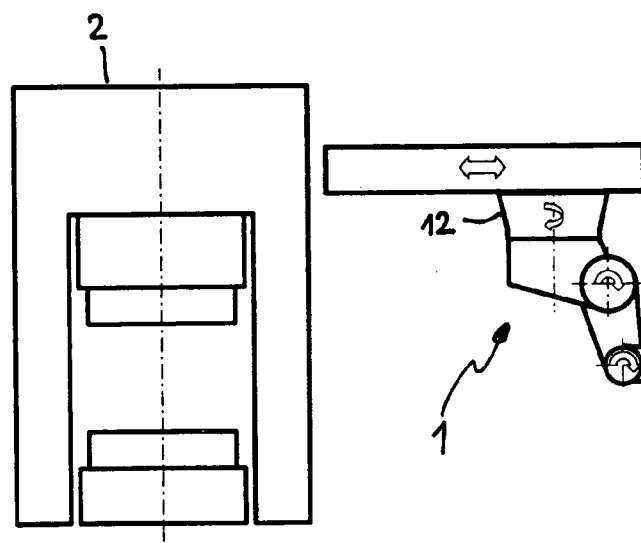
Figure 7:
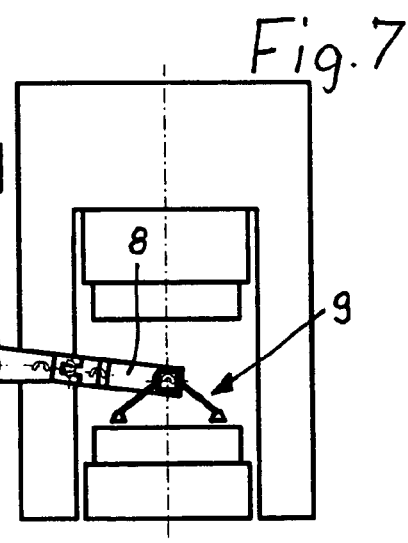

FIGS. 5, 6 and 7 again show the same robot between two presses and in the same positions as in FIGS. 2, 3 and 4, the robot however being suspended and able to be shifted.

Figure 8:
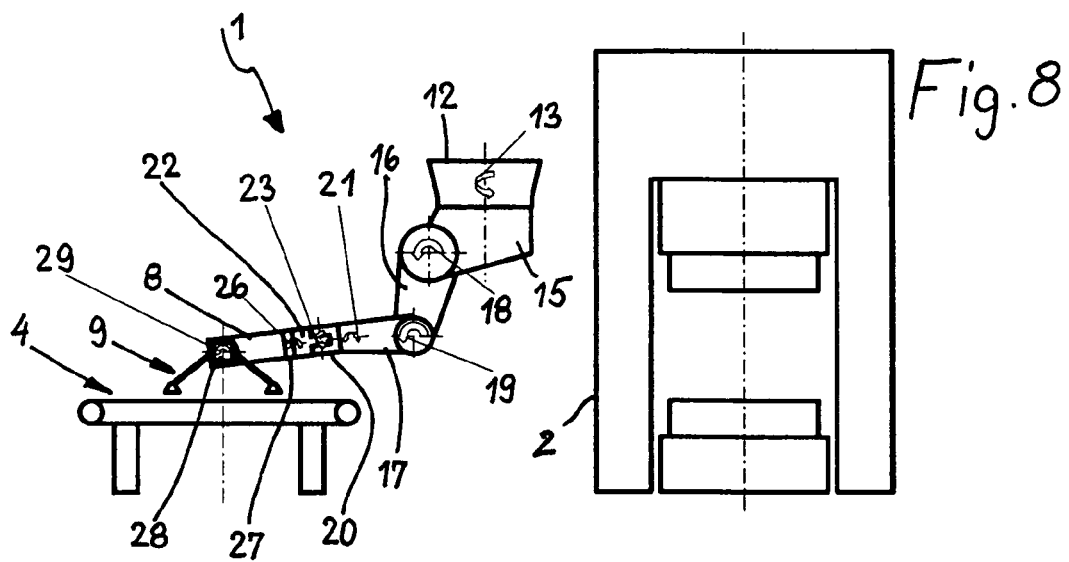
Figure 9:
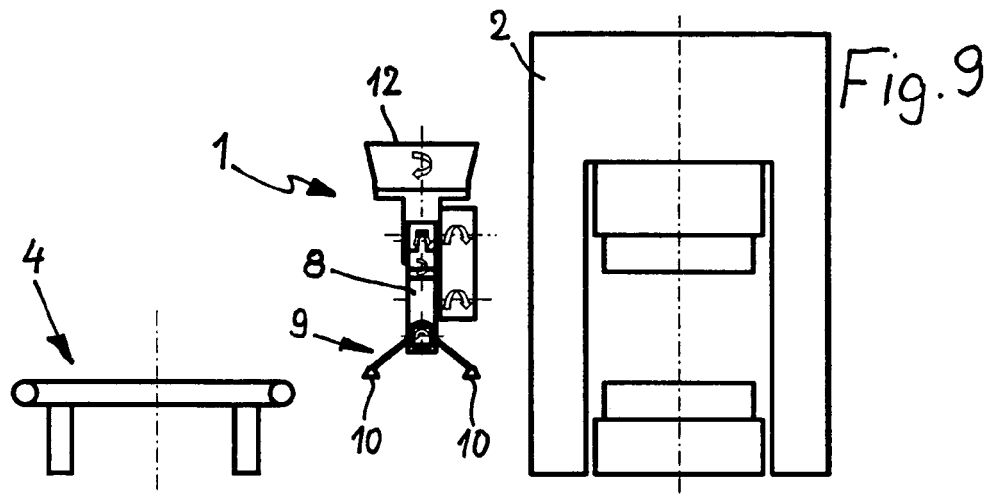
Figure 10:
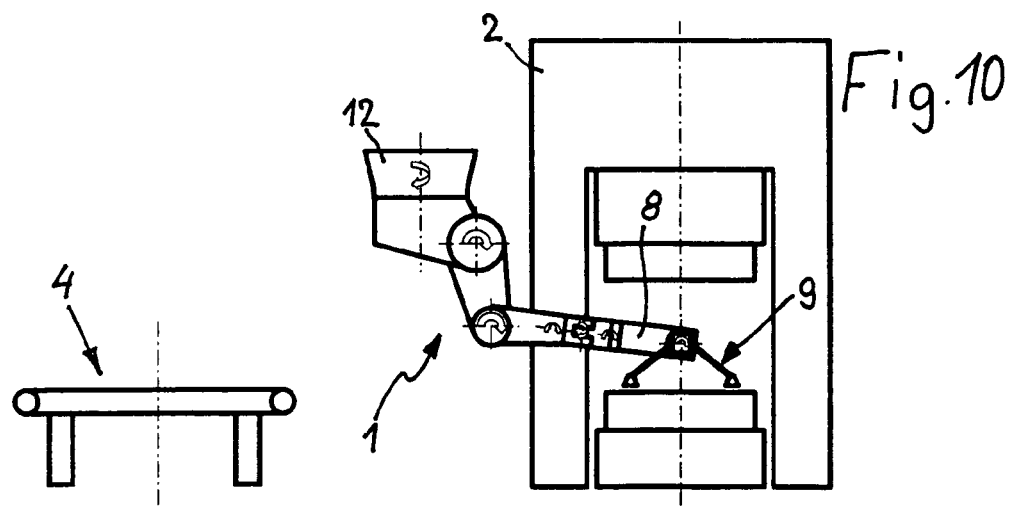

FIGS. 8, 9 and 10 show the same robot in the suspended state to transfer a sheet metal component from a conveying means, arranged in front of one press, to the press, the robot extending in FIG. 8 toward the conveying means to receive the sheet metal component, while in FIG. 9 the robot is in an intermediate position and in FIG. 10 is illustrated depositing the sheet metal component in the press.

Figure 11:
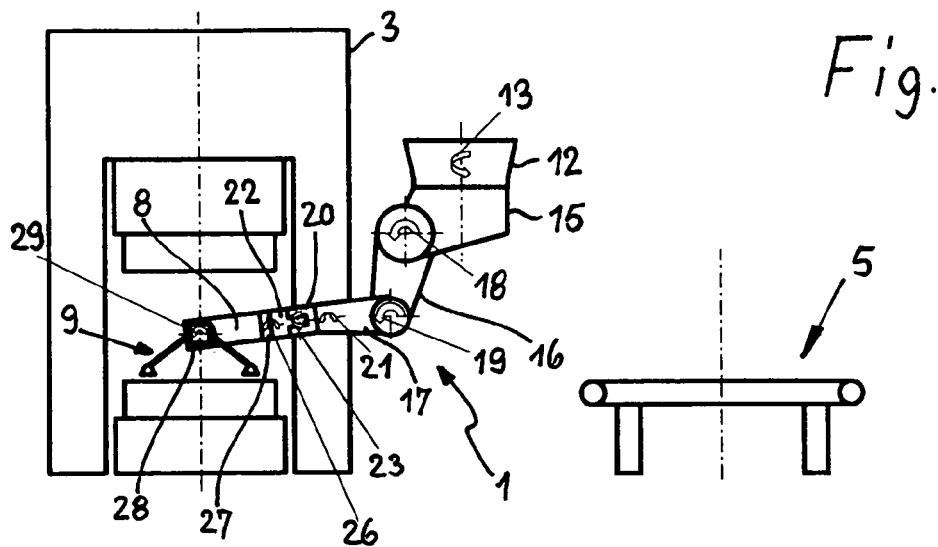
Figure 12:
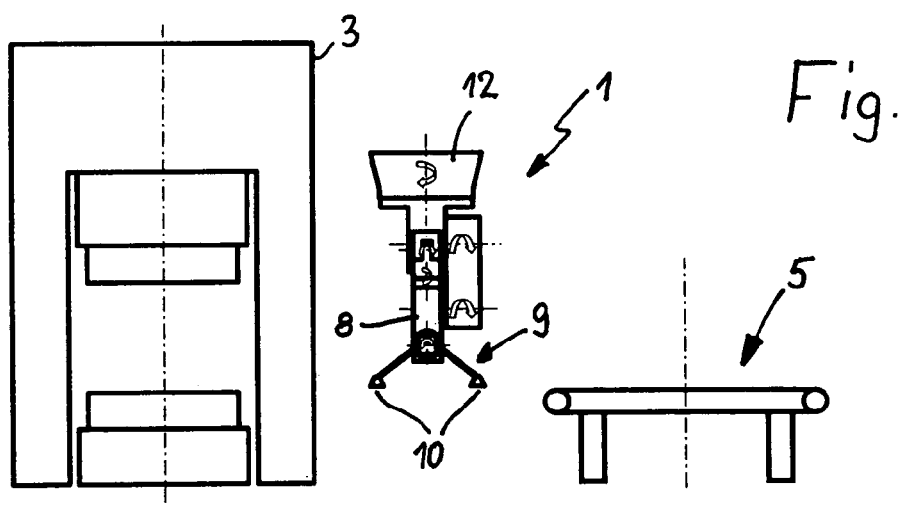
Figure 13:
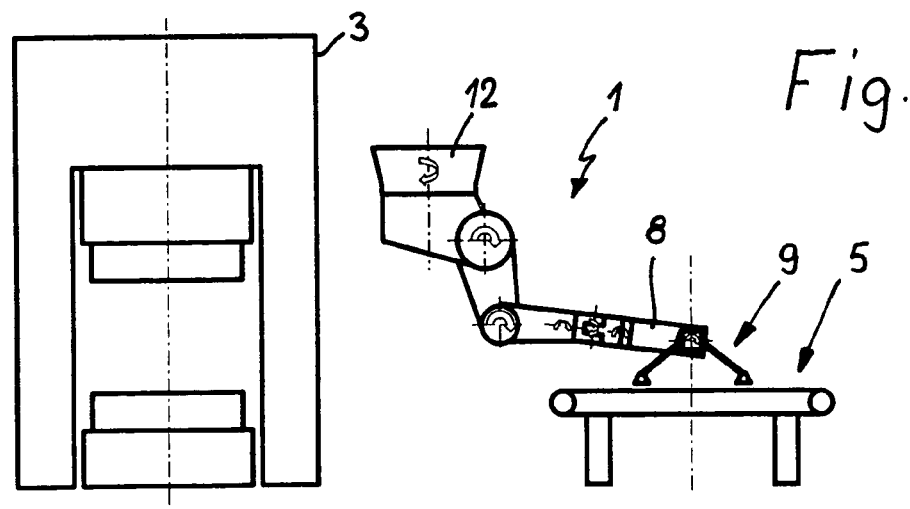

FIGS. 11, 12 and 13 show the same robot in a suspended condition transferring a sheet metal component from a press to a conveying means downstream from the press, such robot being illustrated in FIG. 11 extending into the press to receive a sheet metal component before assuming an intermediate position in FIG. 12 and then extending in the conveying means for depositing the sheet metal component in FIG. 3.

DETAILED ACCOUNT OF WORKING EMBODIMENT OF THE INVENTION

In the case of the robot indicated in the drawings it is a question of a multiple axis articulated arm robot designed for the individualized deposit of sheet metal components, not illustrated, as for example bodywork parts of motor vehicles. In the case of the FIGS. 2 through 4 and 5 through 7 the sheet metal components are transferred in sequence from the one press 2, in which same have been wrought, into the press 3 for further working. The difference between the FIG. 2 through 4 on the one hand and the FIGS. 5 through 7 on the other hand is that the robot is in the one case arranged standing and in the other case is suspended.

In the case of FIGS. 8 through 10 the robot is placed between a conveying means 4 supplying the sheet metal components and the press 2 so that it transfers them from the conveying means 4 to the press 2 on the input side. In FIGS. 11 through 13 the robot 1 is located between the output press 3 and a downstream conveying means 5 so that it takes the sheet metal components, after being wrought in the press 3, from this press 3 and puts them down on the conveying means 5.

In each case the robot 1, as in the working example of FIGS. 2 through 4, may be standing, i.e. on the ground or on a substructure on the ground or on a stage (not illustrated) so that the robot may either be stationary or be able to travel (arrow 6) toward and away from the respective press, or as in the case of the working examples of FIGS. 5 through 13 the robot may be suspended, that is to say either stationary (FIGS. 8 through 13) or able to travel as indicated by the arrow 7 toward the respective press and away from the same again.

The robot 1 bears a supporting part 8, on which a lifting means 9 is arranged. In the working embodiment the lifting means 9 is constituted by a vacuum suction means having a plurality of vacuum suckers 10, which in a conventional manner may be supplied with air or put under vacuum using a vacuum pump and a control means. If the vacuum suction means with the vacuum suckers 10 is applied to a sheet metal component and the vacuum suckers are evacuated then the sheet metal component will stick to the suckers 10 owing to the vacuum therein so that the component may be transferred by the robot. For putting down the sheet metal component the vacuum suckers are supplied with air. Such vacuum suction means are well known so that a detailed description thereof is unnecessary.

The lifting means 9 does not have to be constituted by a vacuum suction means and may be a different lifting means, as for example a magnetic lifting means.

The shafts defining the individual axes of the robot 1, to be described below, are respectively able to be separately driven. The associated motors are depicted in FIG. 1. These drive means for the individual shafts, defining the axes, are widely utilized in the robot art so that here as well a detailed description is not necessary.

The drive means of the robot shafts are, as usual in robotics, able to be so controlled by a control means that the robot performs the desired movements. In the present case the different robot shafts/axes together with a suitable control render possible such a course of movement that the lifting means 9 and accordingly the sheet metal component held thereby performs a linear movement between the two robot terminal positions, such linear movement maintaining its alignment In the two terminal positions, where the sheet metal component is lifted and put down the lifting means 9 performs an up and down movement so that in all in a side view corresponding to the plan of FIGS. 2 through 13, there is a course of motion essentially along a rectangle.

In the case of the robot 1 it is a question of a commercially available robot with the exception of the already mentioned supporting part 8 and the shaft/axis, associated with it, as the seventh axis to be described. The robot possesses a robot base 12 by which the robot is located at the respective site of application. If, as in the case of the FIGS. 2 through 7, the robot is of the travelling type its base 12 will be in the form of a carriage or will be mounted on a suitable carriage, whose movement is guided in the directions of the arrows 6 or 7.

On the robot base 12 a movement unit 14 is pivotally mounted which is able to be pivoted about a first vertical axis 13. The movement unit 14 comprises a pivoting part 15 adjacent to the base and which is mounted on the robot base 12 for pivoting about the first vertical axis 13. The movement unit 14 furthermore comprises an articulated arm constituted by a top arm 16 and a bottom arm 17. The top arm 16 of the articulated arm is at one end able to be pivoted about a second axis, which is horizontal in the position of use with the pivoting part 15 and at the other end is connected with the adjacent end of the bottom arm 17 for pivoting about a horizontal third axis 19.

The movement unit 14 furthermore comprises a rotary member 20 arranged on the bottom arm's 17 end remote from the top arm 16, such rotary member being able to be turned about a fourth axis 21 running in the longitudinal direction of the bottom arm 17. On the end, opposite to the bottom arm 17, of the rotary member 20 a pivoting member 22 is arranged which is connected with the rotary member 20 for pivoting about a fifth axis 23 extending athwart the fourth axis 21. The rotary member 20 possesses two bearing links 24 and 25 arranged with a transverse distance between them, that laterally overlap the pivoting member 22. The shaft defining the fifth axis 23 is seated on the two bearing links 24 and 25.

A rotary member 27 is mounted on the pivoting member 22 and may be turned about a sixth axis 26 extending athwart the fifth axis 23 and the supporting part 8 is attached to such rotary member 27 so that the supporting part 8 participates in the rotary movement of the rotary member 27. Preferably the supporting part 8 is detachably connected with the rotary member 27 so that it may be exchanged with another supporting part in accordance with requirements.

As already mentioned in the case of the parts of the robot 1 as far as including the rotary member 27 it is a question of a commercially available robot.

The supporting part 8 bears, as already mentioned, the lifting means 9 with the vacuum suckers 10. In this case the arrangement is such that the supporting part 8 extends in the direction of the sixth axis away from the pivoting member 22 or, respectively, away from the rotary member 27 mounted thereon and the lifting means 9 possesses a holding means 28 for the vacuum sucker 10, such lifting means being connected with the supporting part 8 to allow rotation about a seventh axis 29 running athwart the sixth axis 26.

The holding means 28 is in the working embodiment constituted by a transverse rod 30 pivotally mounted on the supporting part 8 for turning about the seventh axis 29, the vacuum suckers 10 being arranged along the rod 30. The transverse rod 30 has its longitudinal axis directed in the direction of the seventh axis 29.

As is more especially indicated in FIG. 1 the supporting part 8 has a bearing recess 31 running in the transverse direction, i.e. in the direction of the seventh axis 29, the transverse rod 30 extending through the bearing recess 31. The rotary drive for turning the transverse rod 30 about the seventh axis 29 is located in the supporting part 8. The transverse rod 30 has its middle part borne by the supporting part 8 so that it is held by the supporting part 8 in the middle Owing to the rotatability of the holding means 28 about the seventh axis 29 the respective sheet metal component may always be held with a horizontal alignment.

The control, necessary for the above described transfer of the respective sheet metal component, of the seven axes in all can be readily provided by the man in the art.

The invention claimed is:

1. A multiple axis articulated arm robot for transferring workpieces, and more particularly for transferring sheet metal parts into or from a press or from one press to another adjacently placed press, comprising a robot base, on which a movement unit is able to be pivoted about a first axis, which is vertical in an operational state, such movement unit having a pivoting part adjacent to the base, an articulated arm constituted by a top arm and a bottom arm, such top arm being connected for pivoting at one end about a horizontal second axis with the pivoting part and at the other end is connected with the adjacent end of the bottom arm for pivoting about a horizontal third axis, a rotary member arranged at the bottom arm's end opposite to the top arm, such rotary member being able to be rotated about a fourth axis extending in the longitudinal direction of the bottom arm, a pivoting member connected with the rotary member for pivoting about a fifth axis extending athwart the fourth axis, and a supporting part rotatingly connected with the pivoting member, such supporting part extending athwart the fifth axis, wherein the rotary member is mounted on the pivoting number configured so as to be turned about a sixth axis, a holding means of a lifting means, associated with the workpieces to be transferred, and more particularly a vacuum suction means, is arranged on the supporting part for rotation about a seventh axis, wherein the supporting part is directed in the direction of the sixth axis away from the pivoting member and the seventh axis is directed athwart the sixth axis and wherein the holding means of the lifting means comprised a transverse rod mounted rotably on the supporting part for turning about the seventh axis the longitudinal direction of such rod conforming to the direction of the seventh axis.

2. The robot as set forth in claim 1, wherein the transverse rod extends through a bearing recess in the supporting part extending in the transverse direction.

3. The robot as set forth in claim 1, wherein the transverse rod has a middle part thereof mounted on the supporting part by bearing means.

4. The robot as set forth in claim 1, comprising a rotary member mounted on the pivoting member and able to be turned about the sixth axis, the supporting part being detachably mounted on the rotary member.

* * * * *